US011900250B2

(12) United States Patent
Wang

(10) Patent No.: US 11,900,250 B2
(45) Date of Patent: Feb. 13, 2024

(54) DEEP LEARNING MODEL FOR LEARNING PROGRAM EMBEDDINGS

(71) Applicant: Visa International Service Association, San Francisco, CA (US)

(72) Inventor: Ke Wang, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/423,103

(22) PCT Filed: Oct. 1, 2019

(86) PCT No.: PCT/US2019/054075
§ 371 (c)(1),
(2) Date: Jul. 14, 2021

(87) PCT Pub. No.: WO2020/149897
PCT Pub. Date: Jul. 23, 2020

(65) Prior Publication Data
US 2022/0044119 A1 Feb. 10, 2022

Related U.S. Application Data

(60) Provisional application No. 62/793,500, filed on Jan. 17, 2019.

(51) Int. Cl.
*G06N 3/08* (2023.01)
*G06F 8/41* (2018.01)
(Continued)

(52) U.S. Cl.
CPC .............. *G06N 3/08* (2013.01); *G06F 8/36* (2013.01); *G06F 8/436* (2013.01); *G06N 3/044* (2023.01);
(Continued)

(58) Field of Classification Search
CPC ........ G06N 20/00; G06N 99/005; G06N 3/08; G06N 3/04; G06F 8/4435
See application file for complete search history.

(56) References Cited

U.S. PATENT DOCUMENTS 10,042,740 B2 * 8/2018 Bird .................... G06F 11/3672
10,452,367 B2 * 10/2019 Allamanis ................ G06F 8/72
(Continued)

FOREIGN PATENT DOCUMENTS

CN 107220180 A * 9/2017 .......... G06F 11/3608
CN 107615308 1/2018
(Continued)

OTHER PUBLICATIONS

Wang et al., "Dynamic Neural Program Embeddings for Program Repair" Nov. 20, 2017, arXiv:1711.07163v1, pp. 1-20. (Year: 2017).*
(Continued)

*Primary Examiner* — Miranda M Huang
*Assistant Examiner* — Chase P. Hinckley
(74) *Attorney, Agent, or Firm* — Kilpatrick Townsend & Stockton LLP

(57) ABSTRACT

A system and method for using a deep learning model to learn program semantics is disclosed. The method includes receiving a plurality of execution traces of a program, each execution trace comprising a plurality of variable values. The plurality of variable values are encoded by a first recurrent neural network to generate a plurality of program states for each execution trace. A bi-directional recurrent neural network can then determine a reduced set of program states for each execution trace from the plurality of program states. The reduced set of program states are then encoded by a second recurrent neural network to generate a plurality of executions for the program. The method then includes
(Continued)

pooling the plurality of executions to generate a program embedding and predicting semantics of the program using the program embedding.

15 Claims, 10 Drawing Sheets

(51) Int. Cl.
| | |
|---|---|
| *G06F 8/36* | (2018.01) |
| *G06N 20/00* | (2019.01) |
| *G06N 3/044* | (2023.01) |
| *G06N 3/045* | (2023.01) |
| *G06F 11/36* | (2006.01) |
| *G06F 11/34* | (2006.01) |

(52) U.S. Cl.
CPC ............ *G06N 3/045* (2023.01); *G06N 20/00* (2019.01); *G06F 8/4435* (2013.01); *G06F 11/3466* (2013.01); *G06F 11/36* (2013.01); *G06F 11/3612* (2013.01)

(56) References Cited

U.S. PATENT DOCUMENTS

| | | | | |
|---|---|---|---|---|
| 10,481,879 | B2* | 11/2019 | Stevens | G06F 11/3664 |
| 10,581,888 | B1* | 3/2020 | Agranonik | H04L 63/1425 |
| 10,795,645 | B2* | 10/2020 | Mohamed | G06F 8/30 |
| 11,061,805 | B2* | 7/2021 | Loyola | G06F 11/3692 |
| 11,132,180 | B2* | 9/2021 | Polozov | G06N 3/08 |
| 11,150,875 | B2* | 10/2021 | Brockschmidt | G06F 40/232 |
| 11,256,487 | B2* | 2/2022 | Wang | G06F 8/4441 |
| 2016/0350655 | A1 | 12/2016 | Weiss et al. | |
| 2017/0060844 | A1 | 3/2017 | He et al. | |
| 2017/0140271 | A1 | 5/2017 | Reed et al. | |
| 2017/0213130 | A1 | 7/2017 | Khatri et al. | |
| 2017/0262962 | A1 | 9/2017 | Rad et al. | |
| 2017/0372199 | A1 | 12/2017 | Hakkani-tur et al. | |
| 2018/0129899 | A1 | 5/2018 | Harron et al. | |
| 2018/0189269 | A1 | 7/2018 | Quirk et al. | |
| 2018/0341860 | A1* | 11/2018 | Shazeer | G06N 3/0454 |
| 2018/0357530 | A1* | 12/2018 | Beery | G06N 3/0454 |
| 2019/0034785 | A1* | 1/2019 | Murray | G06N 5/04 |
| 2019/0042745 | A1* | 2/2019 | Chen | G06F 21/552 |
| 2019/0079741 | A1* | 3/2019 | Makkar | G06F 8/33 |
| 2019/0227774 | A1* | 7/2019 | Banuelos | G06F 8/33 |
| 2020/0097261 | A1* | 3/2020 | Smith | G06N 3/0454 |
| 2020/0097387 | A1* | 3/2020 | Loyola | G06F 11/3692 |
| 2020/0097389 | A1* | 3/2020 | Smith | G06F 11/0775 |
| 2020/0117446 | A1* | 4/2020 | Smith | G06F 16/903 |
| 2020/0125482 | A1* | 4/2020 | Smith | G06F 8/36 |
| 2021/0192505 | A1* | 6/2021 | Xu | G06Q 20/1235 |
| 2021/0232376 | A1* | 7/2021 | Wang | G06N 20/00 |

FOREIGN PATENT DOCUMENTS

| | | | |
|---|---|---|---|
| CN | 108344564 | | 7/2018 |
| CN | 109036380 | | 12/2018 |
| CN | 109213520 | | 1/2019 |
| KR | 20180100001 | | 9/2018 |
| WO | WO-2019233112 | A1 * | 12/2019 ............ G06F 8/427 |

OTHER PUBLICATIONS

Shin et al., "Improving Neural Program Synthesis with Inferred Execution Traces" Dec. 3, 2018, NeurIPS, pp. 1-10. (Year: 2018).*
Alon et al., "Code2Seq: Generating Sequences from Structured Representations of Code" Jan. 4, 2019, arXiv:1808.01400v3, pp. 1-22. (Year: 2019).*
Zhang et al., "GaAN: Gated Attention Networks for Learning on Large and Spatiotemporal Graphs" Mar. 20, 2018, arXiv:1803.07294v1, pp. 1-10. (Year: 2018).*
Liang et al., "Memory Augmented Policy Optimization for Program Synthesis and Semantic Parsing" Jan. 13, 2019 arXiv:1807.02322v5, pp. 1-17. (Year: 2019).*
Smith et al., "Code Completion" Sep. 22, 2018, U.S. Appl. No. 62/735,024. (Year: 2018).*
Shin et al., "Learning What to Learn in a Neural Program" 2018. (Year: 2018).*
Shin et al., "Towards Specification-Directed Program Repair" 2018 (Year: 2018).*
Chen et al., "Execution-Guided Neural Program Synthesis" 2018. (Year: 2018).*
Devlin et al., "Semantic Code Repair using Neuro-Symbolic Transformation Networks" Oct. 30, 2017, pp. 1-11. (Year: 2017).*
Hu et al., "Program Repair via Direct State Manipulation" Mar. 20, 2018, pp. 1-20. (Year: 2018).*
Ben-Nun et al., "Neural Code Comprehension: A Learnable Representation of Code Semantics" Nov. 29, 2018, pp. 1-17. (Year: 2018).*
Yin et Neubig, "Learning to Represent Edits" Oct. 31, 2018, pp. 1-17. (Year: 2018).*
Wang et al., "Program Synthesis using Abstraction Refinement" Jan. 2018, pp. 1-30. (Year: 2018).*
Wan et al., "Improving Automatic Source Code Summarization via Deep Reinforcement Learning" Sep. 2018, pp. 397-407. (Year: 2018).*
Chen et al., "SequenceR: Sequence-to-Sequence Learning for End-to-End Program Repair" Dec. 24, 2018, pp. 1-21. (Year: 2018).*
Zheng et al., "Code Attention: Translating Code to Comments by Exploiting Domain Features" Nov. 27, 2017, pp. 1-12. (Year: 2017).*
Alon et al., "code2vec: Learning Distributed Representations of Code" Oct. 30, 2018, pp. 1-30. (Year: 2018).*
Hu et al., "Deep Code Comment Generation" May 2018, pp. 200-210. (Year: 2018).*
Devlin et al., "Semantic Code Repair using Neuro-Symbolic Transformation Networks" Oct. 30, 2017, arXiv: 1710.11054v1, pp. 1-11. (Year: 2018).*
Vasic et al., "Neural Program Repair by Jointly Learning to Localize and Repair" Sep. 27, 2018, pp. 1-12. (Year: 2018).*
Shen et al., "Bi-Directional Block Self-Attention for Fast and Memory-Efficient Sequence Modeling" Apr. 3, 2018, arXiv:1804.00857v1, pp. 1-18. (Year: 2018).*
Shen et al., "DiSAN: Directional Self-Attention Network for RNN/CNN-Free Language Understanding" Nov. 20, 2017, arXiv:1709.0469v3, pp. 1-10. (Year: 2017).*
Gu et al., "Deep Code Search" May 27, 2018, pp. 1-12. (Year: 2018).*
Hu et al., "Deep Code Comment Generation" May 27, 2018, pp. 1-11. (Year: 2018).*
Tufano et al., "An Empirical Investigation into Learning Bug-Fixing Patches in the Wild via Neural Machine Translation" Sep. 2018, pp. 1-6. (Year: 2018).*
Zhao et Huang, "DeepSim: Deep Learning Code Functional Similarity" Nov. 2018, pp. 1-11. (Year: 2018).*
Henkel et al., "Code Vectors: Understanding Programs Through Embedded Abstracted Symbolic Traces" Nov. 2018, pp. 1-12. (Year: 2018).*
Allamanis et Brockschmidt "SmartPaste: Learning to Adapt Source Code" May 22, 2017, arXiv: 1705.07867v1, pp. 1-31. (Year: 2017).*
Srivastava et al., "Dropout: A Simple Way to Prevent Neural Networks from Overfitting" Jun. 2014, JMLR, pp. 1929-1958. (Year: 2014).*
Wang et Su, "Learning Blended, Precise Semantic Program Embeddings" Jul. 11, 2019, arXiv: 1907.02136v2, pp. 1-25. (Year: 2019).*
Defreez et al., "Path-Based Function Embedding and Its Application to Error Handling Specification Mining" Nov. 2018, pp. 423-433. (Year: 2018).*
Application No. PCT/US2019/054075, International Search Report and Written Opinion, dated Jan. 16, 2020, 9 pages.

(56) References Cited

OTHER PUBLICATIONS

Chen, et al. "SequenceR: Sequence-to-Sequence Learning for End-to-End Program Repair", IEEE Transactions on Software Engineering, vol. TBD, 2019, arXiv:1901.01808v3 [cs.SE] Sep. 9, 2019, 17 pages.
Pradel, et al., "DeepBugs: A Learning Approach to Name-based Bug Detection", arXiv:1805.11683v1 [cs.SE] Apr. 30, 2018, 23 pages.
Allamanis, et al., "Learning to Represent Programs With Graphs", Published as conference paper at ICLR, 2018, arXiv:1711.00740v3 [csL.LG], May 4, 2018, 17 pages.
Henkel, et al. Code Vectors: Understanding Programs Through Embedded Abstracted Symbolic Traces, arXiv:1803.06686v2 [cs.SE] Aug. 20, 2018, 12 pages.
Wang, et al. "Dynamic Neural Program Embeddings For Program Repair", Published as conference paper at ICLR, 2018, arXiv:1711.07163v4 [cs.AI] Jun. 30, 2018.
Application no. EP19909938.3 , Extended European Search Report, dated Feb. 2, 2022, 7 pages.
Bhatia et al., "Neuro-Symbolic Program Corrector for Introductory Programming Assignments", ICSE '18, International Conference on Software Engineering, Jun. 3, 2018, 11 pages.
Application No. CN201980089331.8 , Office Action, dated Nov. 29, 2021, 14 pages.
Zheng , "Research on Software Mining Technology for the Open Source Community", China Doctor's and Master's Theses Full-Text Database (Master's), Information Technology Series, May 25, 2018, 75 pages.
Application No. CN201980089331.8 , Office Action, dated May 27, 2022, 15 pages
Application No. SG11202107620Q , Written Opinion, dated Jun. 28, 2022, 8 pages.
Application No. CN201980089331.8 , Notice of Decision to Grant, dated Aug. 22, 2022, 6 pages.
Application No. EP19909938.3 , Office Action, dated Oct. 26, 2022, 4 pages.
Application No. EP19909938.3 , Office Action, dated Mar. 15, 2023, 7 pages.

* cited by examiner

| Tasks | Training Set | Validation Set | Training Set |
|---|---|---|---|
| Array Average | 1,548 | 166 | 170 |
| Array $k^{th}$ largest | 561 | 168 | 162 |
| Array Max Diff | 1,007 | 166 | 170 |
| Parenthesis | 723 | 168 | 165 |
| String Reverse | 882 | 166 | 167 |
| Print Chessboard | 5,279 | 166 | 166 |
| Total | 10K | 1K | 1K |

FIG. 5A

| Tasks | Training Set | Validation Set | Testing Set |
|---|---|---|---|
| Constant and Variable Propagation | 45,223 | 10,000 | 10,000 |
| Dead code Elimination | 41,710 | 10,000 | 10,000 |
| Hoisting | 29,895 | 5,000 | 5,000 |
| Induction Variable Elimination | 10,038 | 8,00 | 8,00 |
| Symbolic Execution Simulation | 128,924 | 10,000 | 10,000 |

FIG. 5B

| Models | Constant and Variable Propagation | | Dead code Elimination | | Hoisting | | Induction Variable Elimination | |
|---|---|---|---|---|---|---|---|---|
| | Accuracy | F1 | Accuracy | F1 | Accuracy | F1 | Accuracy | F1 |
| GGNN | 98.1% | 0.92 | 91.5% | 0.87 | 63.8% | 0.61 | 59.6% | 0.55 |
| TreeLSTM | 92.4% | 0.88 | 83.2% | 0.82 | 56.4% | 0.59 | 53.5% | 0.52 |
| DyPro | 98.3% | 0.95 | 94.8% | 0.91 | 92.7% | 0.88 | 90.3% | 0.82 |

Result of semantic analysis.

DEEP LEARNING MODEL FOR LEARNING PROGRAM EMBEDDINGS

CROSS-REFERENCE TO RELATED APPLICATIONS

This application is a 371 application of International Patent Application Number PCT/US2019/054075, filed Oct. 1, 2019, which claims the benefit of the filing date of U.S. Provisional Application No. 62/793,500, filed on Jan. 17, 2019, which are herein incorporated by reference in their entirety.

BACKGROUND

The growing trend of open-sourcing software and rapid development of machines learning techniques have materialized the concept of "big code". The idea is reusing the knowledge distilled from existing code repositories to, for example, simplify the development of software and improve the quality of the product. Some early methods in the field primarily treated source code as a piece of text and applied off-the-shelf models from the natural language processing domain (Abram Hindle, Earl T Barr, Zhendong Su, Mark Gabel, and Premkumar Devanbu. On the naturalness of software. In *Software Engineering (ICSE)*, 2012 *34th International Conference on*, pages 837-847. IEEE, 2012, Rahul Gupta, Soham Pal, Aditya Kanade, and Shirish Shevade. Deepfix: Fixing common c language errors by deep learning. 2017, Yewen Pu, Karthik Narasimhan, Armando Solar-Lezama, and Regina Barzilay. sk_p: a neural program corrector for moocs. In *Companion Proceedings of the* 2016 *ACM SIGPLAN International Conference on Systems, Programming, Languages and Applications: Software for Humanity*, pages 39-40. ACM, 2016), while later approaches modeled programs with Abstract Syntax Trees (AST) (Chris Maddison and Daniel Tarlow. Structured generative models of natural source code. In *International Conference on Machine Learning*, pages 649-657, 2014, Pavol Bielik, Veselin Raychev, and Martin Vechev. Phog: probabilistic model for code. In *International Conference on Machine Learning*, pages 2933-2942, 2016, Lili Mou, Ge Li, Lu Zhang, Tao Wang, and Zhi Jin. Convolutional neural networks over tree structures for programming language processing. 2016).

Although these efforts manage to transform programs in an amenable form to deep learning models, they may only capture shallow, syntactic features and can fail to capitalize on the well-defined program semantics. Of late, a number of deep learning models have emerged are that dedicated to the purpose of learning representations for program semantics (Ke Wang, Rishabh Singh, and Zhendong Su. Dynamic neural program embedding for program repair. *arXiv preprint arXiv*:1711.07163, 2017, Daniel DeFreez, Aditya V. Thakur, and Cindy Rubio-González. Path-based function embeddings. In *Proceedings of the* 40*th International Conference on Software Engineering: Companion Proceedings*, ICSE '18, pages 430-431, New York, NY, USA, 2018, Jordan Henkel, Shuvendu Lahiri, Ben Liblit, and Thomas Reps. Code vectors: Understanding programs through embedded abstracted symbolic traces. *arXiv preprint arXiv:* 1803.06686, 2018, Miltiadis Allamanis, Marc Brockschmidt, and Mahmoud Khademi. Learning to represent programs with graphs. *arXiv preprint arXiv:*1711.00740, 2017, Uri Alon, Meital Zilberstein, Omer Levy, and Eran Yahay. code2vec: Learning distributed representations of code. *arXiv preprint arXiv:*1803.09473, 2018).

Those works can be divided into two categories: dynamic and static. Dynamic models learn from the execution of programs such as the sequence of program states proposed in Wang et al. or abstract symbolic traces in Henkel et al. Static models are modeled after the way static analyses extract program semantics in the domain of former methods. These previous models are not robust at figuring out semantics, and thus are not entirely effective.

Embodiments of the disclosure address these and other problems individually and collectively.

BRIEF SUMMARY

One embodiment of the disclosure includes receiving a plurality of execution traces of a program, each execution trace comprising a plurality of variable values. The method also includes encoding, by a first recurrent neural network, the plurality of variable values to generate a plurality of program states for each execution trace, and determining, by a bi-directional recurrent neural network, a reduced set of program states for each execution trace from the plurality of program states. The method also includes encoding, by a second recurrent neural network, the reduced set of program states to generate a plurality of executions for the program. The method also includes pooling the plurality of executions to generate a program embedding and predicting semantics of the program using the program embedding.

Another embodiment of the disclosure includes a computer comprising a processor and a computer-readable medium comprising code, executable by the processor, for implementing a method including receiving a plurality of execution traces of a program, each execution trace comprising a plurality of variable values. The method also includes encoding, by a first recurrent neural network, the plurality of variable values to generate a plurality of program states for each execution trace, and determining, by a bi-directional recurrent neural network, a reduced set of program states for each execution trace from the plurality of program states. The method also includes encoding, by a second recurrent neural network, the reduced set of program states to generate a plurality of executions for the program. The method also includes pooling the plurality of executions to generate a program embedding and predicting semantics of the program using the program embedding.

Further details regarding embodiments of the disclosure can be found in the Detailed Description and the Figures.

BRIEF DESCRIPTION OF THE DRAWINGS

FIG. 5A and 5B show tables of example datasets according to embodiments.

FIG. 11 shows a table of prediction accuracy results for several semantics predicting models.

DETAILED DESCRIPTION

Figure 1:
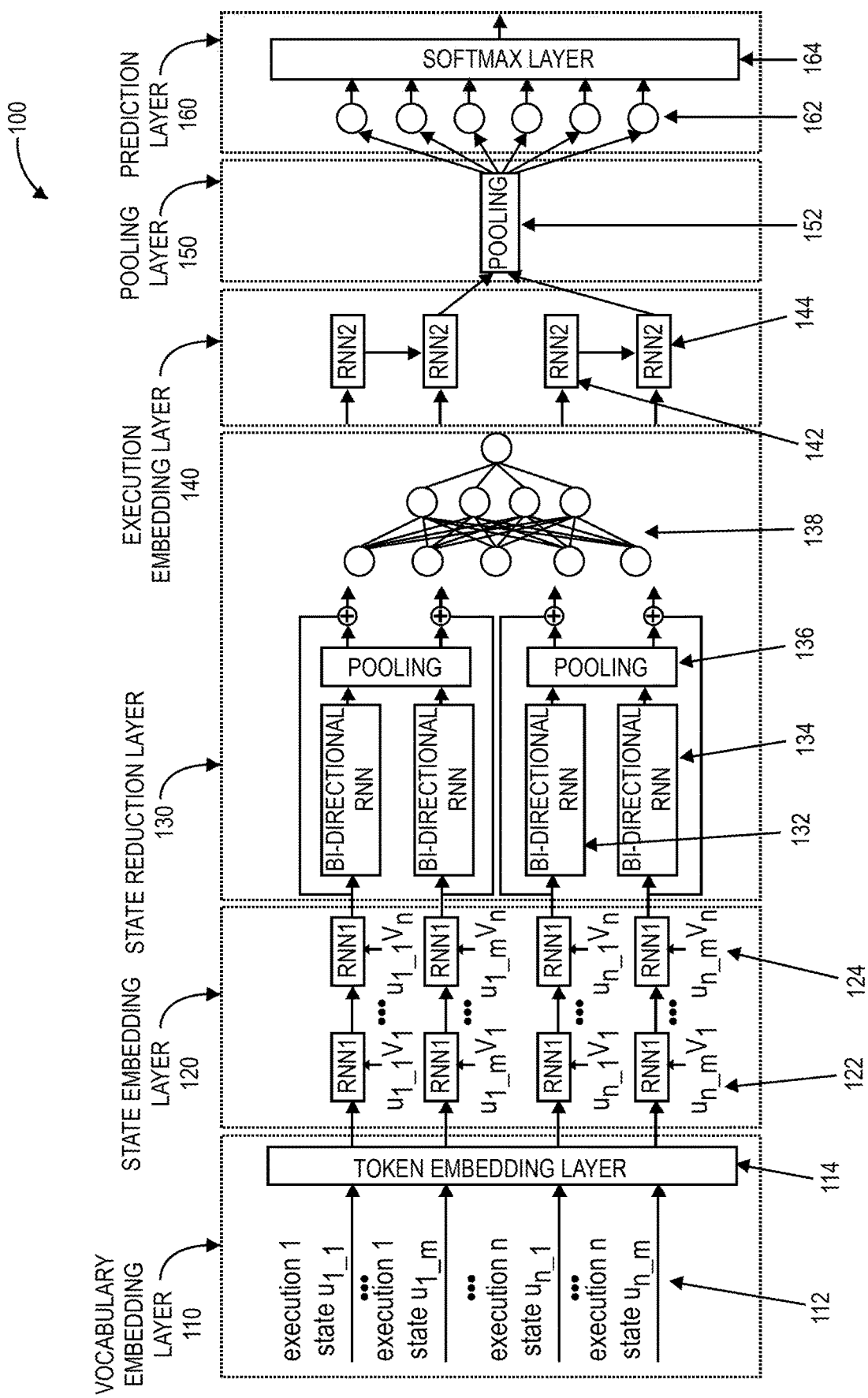
FIG. 1 shows a deep learning model architecture according to embodiments.

Embodiments of the disclosure include a deep learning model that is configured to learn dynamic program semantics. Semantics include the meaning of a piece of text (e.g., the meaning of a sentence, the function of a computer program), as opposed to the syntax, or the contents of the piece of text (e.g., the words in a sentence, the variables in a computer program). As an example, the sentences "I have a black cat" and "I have a cat that is black" have the same semantics despite having different syntax. The semantics of a program may relate to the functionality of the program. Program functionality may refer to a problem solved by the program, while program semantics refers to the way in which the problem is solved by the program.

A dynamic deep learning model may be a model that learns from executions of a program, as opposed to a static deep learning model that learns from the text of a program. The deep learning model may allow for learning program embeddings through neural networks. A deep learning model according to embodiments can build upon and improve the state trace model of Wang et al. to not only able to compress execution traces to avoid problems related to scalability, but to also generalize across multiple executions of different inputs.

In embodiments, the deep learning model may comprise at least two recurrent neural networks (RNN) and a bi-directional RNN. Embodiments may address the shortcomings of other models (e.g., those proposed in Wang et al.). In particular, embodiments address scalability issues. When programs are being executed, the traces can grow arbitrarily long, making it difficult for RNNs to generalize. Furthermore, other models may not learn the program semantics; instead, they may learn from individual execution traces to predict the characteristics of individual runs of the program.

Embodiments may be applied to examples such as analyzing unknown code. For example, a deep learning model according to embodiments can be trained on programs. A user may then come across a program of unknown purpose. The user can pass the program through the model to identify the semantics of the program. Embodiments can also be used when writing a program. If the computer understands the semantics, it can suggest and auto-write code for the program based on the semantics.

Prior to discussing embodiments of the disclosure, some terms can be described in further detail.

An "execution trace" may be a log of information about the execution of a program. While a computer program is executed, an execution trace may be built. An execution trace may, for example, record each line of source code as it is executed. In some embodiments, an execution trace may record the contents of computer memory at each time step of a program execution.

A "program state" may be the contents of a computer's memory at any given point during execution of a program. The program state may comprise one or more variables. Each variable may represent a storage location in computer memory.

"Semantics" may be the meaning of a piece of text. This may be differentiated from syntax, or the structure of a piece of text. Semantics may be used to analyze the meaning of code in a computer program. In particular, operational semantics may describe the results of the execution of text. The operational semantics of a computer program may be related to the functionality of the program.

An "embedding" may be a numerical representation of a high-dimensional vector. An embedding may make it easier to perform computations on the input vector. Some embeddings may preserve the semantics of the input vector by placing semantically similar inputs close together the embedding. A program embedding may be a relatively low-dimensional representation of a computer program.

A "token" can be a unit of information as input in a machine learning model. For example, in natural language processing model, a token may be a word or particular punctuation in a block of text. In an program processing model, a token may be a word or a variable value in an execution trace.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines, models that classify data by establishing a gap or boundary between inputs of different classifications, as well as neural networks, which are collections of artificial "neurons" that perform functions by activating in response to inputs.

A "machine learning classifier" may include a machine learning model that can classify input data or feature vectors. For example, an image classifier is a machine learning model that can be used to classify images, such as images of animals. As another example, a news classifier is a machine learning model that can classify news articles as "real news"

or "fake news." As a third example, an anomaly detector, such as a credit card fraud detector, can classify input data such as credit card transactions as either normal or anomalous. The output produced by a machine learning classifier may be referred to as "classification data." Machine learning classifiers may also include clustering models, such as K-means clustering. Clustering models can be used to partition input data or feature vectors into multiple clusters. Each cluster may correspond to a particular classification. For example, a clustering model may accept feature vectors corresponding to the size and weight of dogs, then generate clusters of feature vectors corresponding to small dogs, medium dogs, and large dogs. When new input data is included in a cluster (e.g., the small dogs cluster), the clustering model has effectively classified the new input data as input data corresponding to the cluster.

A "feature vector" may include a set of measurable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from input data. A feature vector can be used as the input to a machine learning model, such that the machine learning model produces some output or classification. The construction of a feature vector can be accomplished in a variety of ways, based on the nature of the input data. For example, for a machine learning classifier that classifies words as correctly spelled or incorrectly spelled, a feature vector corresponding to a word such as "LOVE" could be represented as the vector (12, 15, 22, 5), corresponding to the alphabetical index of each letter in the input data word. For a more complex input, such as a human entity, an exemplary feature vector could include features such as the human's age, height, weight, a numerical representation of relative happiness, etc. Feature vectors can be represented and stored electronically in a feature store. Further, a feature vector can be normalized, i.e., be made to have unit magnitude. As an example, the feature vector (12, 15, 22, 5) corresponding to "LOVE" could be normalized to approximately (0.40, 0.51, 0.74, 0.17).

A "label" may be an output of a machine learning model. A label may be a numerical value, in particular a probability, or a classification. For example, labels may be fraud, non-fraud, spam, non-spam, dog, and cat. Labels may be output as a probability, such as 95% spam and 5% non-spam.

A "deep neural network (DNN)" may be a neural network in which there are multiple layers between an input and an output. Each layer of the deep neural network may represent a mathematical manipulation used to turn the input into the output. In particular, a "recurrent neural network (RNN)" may be a deep neural network in which data can move forward and backward between layers of the neural network.

An "analytical model" may be a computer model that can analyze data. An analytical model may be a machine learning model, such as a neural network. An analytical model may be trained or built based on a set of training data. Analytical models may be used to analyze, for example, authorization requests, meteorological data, and financial trends.

A "hidden layer" may be a layer of a neural network that is between an input layer and an output layer. The output of a hidden layer may be an intermediate output that can be used as input for other layers of the neural network. Hidden layers can compute complex, non-linear functions of input data. The output of a hidden layer may be referred to as a "hidden state".

FIG. 1 shows an architecture of a deep learning model 100 according to embodiments of the disclosure. The deep learning model 100 may comprise a vocabulary embedding layer 110, a state embedding layer 120, a state reduction layer 130, an execution embedding layer 140, a pooling layer 150, and a prediction layer 160.

The vocabulary embedding layer 110 may identify variable values in execution traces and encode the variable values as numerical vectors. It may receive a plurality of execution traces, each execution trace representing an execution of a particular computer program. As an example, consider a spell-checking program. Each execution trace may be a record of the variables in the program as it checks the spelling of one word. An execution trace may be a record of the execution of a computer program, and may be broken into a plurality of tokens (e.g., values of variables in the program). For example, a spell-checking program may have variables for the current word being checked, a candidate word, the differences between the current word and the candidate word, and the best candidate word. Each word of value that the variables take on can be identified as a separate token. The vocabulary embedding layer 110 can encode each token in the execution trace into a vector.

An example execution trace of a spell-checking program is listed below. This can be a program that identifies a word that is not in a dictionary, and thus is likely misspelled. The program may then assign the word to a "current" variable. Then, the program may iterate through the words in the dictionary. On each iteration, a word may be assigned to a "candidate" variable and the program may compute a distance score between the current word and the candidate word. The distance score may be stored in a "score" variable, where a lower score indicates words that are more similar. If the score is the lowest score that has been computed thus far, the candidate word may be stored in a "best" variable. After iterating through the dictionary of candidate words, the best word can be output as the correction of the misspelled word.

In this example, a suggestion is determined for "kittin". Each row of the table may represent memory of a computer running the program after one iteration of the program. At the first step, a candidate word ("soot") is selected and a distance score (7) is calculated. As there are no other scores to compare to, "soot" is assigned as the best candidate word. At the second step, "kitty" is selected as the candidate word, resulting in a distance score of 2. By comparing the score with the score of the current best candidate word, the program may determine that "kitty" is a better candidate than "soot", so "kitty" is assigned as the best candidate word. The process can repeat for "kitten", which has an even smaller distance score than "kitty". "Kitten" is thus assigned as the best candidate word. At the last two steps, two more words are selected and scores calculated. As both "rank" and "blob" have greater distance scores than "kitten", the variable for best candidate word is not changed. After iterating through all possible candidate words, the current best word ("kitten" in this example) is returned as the corrected spelling of the current word "kittin".

| Current | Candidate | Score | Best |
| --- | --- | --- | --- |
| kittin | soot | 7 | soot |
| kittin | kitty | 2 | kitty |
| kittin | kitten | 1 | kitten |

-continued

| Current | Candidate | Score | Best |
|---------|-----------|-------|------|
| kittin | rank | 4 | kitten |
| kittin | blob | 5 | kitten |

Returning to FIG. 1, the vocabulary embedding layer 110 may take in a plurality of states for a plurality of executions of a program. For example, the input may include n execution traces $(u_1, \ldots, u_n)$, each execution trace made up of m states $(u_{1\_1}, \ldots, u_{1\_m})$. A state of an execution trace, such as state $u_{n\_m}$ 112, can be input for a token embedding layer 114. The token embedding layer may be a recurrent neural network (RNN). An embedding may be a numerical representation of a high-dimensional vector. The token embedding layer 114 can form an embedding for each variable value (or token) in state $u_{n\_m}$ 112. In one example, one state of a spell-checking program may be the values of variables for the current word, the candidate word, the score, and the best candidate word at a given moment. A state may be represented as one row in the exemplary table above, and each cell may represent a variable value that can be embedded as a token. The current word may be "kittin" and the token embedding for the current word variable may be a numerical representation of string. In another example, the program may compute exponents using the formula $x^y=3$. If state $u_{n\_m}$ 112 contains the variable values x=2, y=3, and z=8, then a token embedding for the variable x may be the vector (2, 0, 0), indicating that the first variable (x) has a value of 2. The token embedding may use one-hot encoding. The embedding may be the final hidden state of the token embedding layer 114.

The state embedding layer 120 may determine a vector to represent a program state based on the token embeddings of values in the program state. It may comprise a first recurrent neural network (RNN), or a plurality of copies of the first RNN. The state embedding layer 120 may encode the vectors representing the variable values into program states. A program state may be the contents of a computer's memory at a given point during execution of the program. Each program state may be represented as a state embedding. To generate the state embedding, each sequence of values for each program state may be run into the state embedding layer 120. For a spell-checking program, the state embedding may be a numerical representation of the token embeddings of variables for the current word being checked, a candidate word, the differences between the current word and the candidate word, and the best candidate word at a given moment. The final hidden states of the state embedding layer may then be collected as the embeddings. An embedding vector may be generated in this way for each program state of each execution of the program.

Each RNN 122 may process a vocabulary word (e.g., a variable) $u_{n\_m\_v_1}$. There may be n RNNs 122 that together generate a state embedding for a state m with vocabulary words $u_{n\_m\_v_1} \ldots u_{n\_m\_v_n}$. The output of the state embedding layer 120 can be the state embedding, and the state embedding can be an output of a last hidden layer 124 of the state embedding layer 120.

The state reduction layer 130 may identify a subset of program states of an execution that best represent the action of the program. It may comprise a bi-directional RNN for each state embedding. The state reduction layer 130 may determine a reduced number of program states associated with the execution. For example, a first bi-directional RNN 132 may analyze the state embedding for state $u_{n\_1}$ of execution $u_n$ and a second bi-directional RNN 134 may analyze the state embedding for state $u_{n\_m}$ of execution $u_n$.

The first bi-directional RNN 132 and the second bi-directional RNN 134 may each generate contextual vectors for each state embedding vector. A contextual vector may be a vector comprising information about a state in relationship to the states that come before and after it. The state reduction layer 130 may determine two contextual vectors for each program state: a forward context vector and a backward context vector. The forward context vector may quantify the influence of the program state with regards to states that came before it. The backward context vector may quantify the influence of the program state with regards to states that come after it. In embodiments, a contextual vector with large values may indicate that a program state has a large impact on other states in the execution. A contextual vector with smaller values may indicate that the program state has a smaller impact on the other states in the other execution. As an example, for a spell-checking program, states where a word that is very similar to the current word (and thus a likely correction of the word) may have large importance. If the current word is "kittin", then the state comparing "kitten" as a candidate word may have a contextual vector with large values. A candidate word that is very different from the current word may not have a large impact. For example, the state comparing "rank" as a candidate word to "kittin" may have a contextual vector with small values. In some embodiments, values may be in a range between 0 and 1.

The pooling layer 136 can compare the contextual vectors (the forward contextual vector and the backward contextual vector) to determine the states that need to be retained and those that can be removed. The state reduction layer 130 may use a multilayer perceptron (MLP) 138 of a single sigmoid output neuron to predict the necessity of each program state. For example, output neuron may indicate a number (e.g., percentage, decimal) indicating how much the state should be kept. If the output of the neuron is above a threshold (e.g., 0.5), the state can be kept. Otherwise, the state can be rejected. The state reduction process can be repeated to optimize the reduction to minimize the sum of the outputs of the MLP. A lower total output of the MLP may incentive the deep learning model to decrease the number of program states as much as possible.

The execution embedding layer 140 may determine a vector to represent the execution based on the subset of state embeddings from the state reduction layer. It may be a second RNN. The execution embedding layer 140 may encode the reduced set of program states as an embedding vector representing an execution of the program. The execution embedding layer 140 can take as input the state embeddings of the reduced set of program states. For example, the execution embedding layer 140 may determine an embedding representing the first three program states of the above table. The execution embedding layer can output the final hidden state of the RNN as a program embedding. There may be a plurality of embedding vectors for the program representing the plurality of executions.

The pooling layer 150 may combine the execution embeddings of the program to form a vector representing the program. The pooling layer 150 can take as an input the execution embeddings from the execution embedding layer 140. The pooling layer 150 may then use a pooling function 152 to pool the execution embeddings to form a vector. For example, for a spell-checking program, the pooling layer 150 may pool the execution embeddings for executions formed from a plurality of words, both correct and misspelled (e.g., "kittin", "legume", "break", and "missake").

The pooling function 152 may be, for example, a max pooling function. The pooling function 152 may alternatively be an average pooling function. For each dimension of the execution embeddings, the pooling layer 150 may retain the largest value in that dimension of the execution embeddings.

The prediction layer 160 may output an prediction about the semantics of the program. The prediction layer 160 may comprise dense layer 162 and a softmax layer. The dense layer 162 may be a layer with an input neuron for each functionality that is being predicted. The dense layer 162 can create a probability distribution. The softmax layer can determine probabilities for multiple classifications. The multiple classifications may include a list of program functionalities. If the classification is a binary classification (e.g., if there are only two semantic classifications), other activation functions may be used instead of the softmax function, such as ReLU or sigmoid functions. In some embodiments, the prediction layer may return a probability that the program is performing one of a set of functionalities. For example, the prediction layer 160 may indicate the probability that the program is configured to reverse a string of characters. As another example, the prediction layer 160 may indicate the probability that the program is configured to check the spelling, check the grammar, or check capitalization of a piece of text.

The deep learning model 100 may be trained to minimize the cross-entropy loss as well as the sum of the outputs of the MLP for all program states in an execution. Cross-entropy loss can quantify the performance of the deep learning model. Cross-entropy can be estimated as $$H(T, q) = -\sum_{i=1}^{N} \frac{1}{N} \log_2 q(x_i)$$

where N is the number of programs being classified in a training set T, and $q(x_i)$ is the probability of the deep learning model classifying a program with the semantic classification $x_i$. A correctly classified program may result in $q(x_i)=1$ or very close to 1, so $\log_2 q(x_i)=0$ or very close to 0, contributing very little to the cross-entropy loss. An incorrectly classified program may result in $q(x_i)=0$ or very close to 0, so $\log_2 q(x_i)$ is very large in absolute value (approaching infinity). The more incorrect the prediction, the greater the contribution to the cross-entropy loss. Other embodiments may use other loss functions.

Minimizing cross-entropy loss can thus increase the accuracy of the model. Minimizing the sum of the outputs of the MLP can incentive the deep learning model to minimize the number of program states in the reduced set of program states as much as possible. An MLP output of 1 can indicate that a program state is definitely retained and an MLP output of 0 can indicate that the program state is definitely rejected. Thus, by decreasing the total MLP output can lead to fewer program states in the reduced set of program states. The combination of minimizing cross-entropy loss and the sum of the outputs of the MLP can result in a model that reduces the number of program states while maintaining high prediction accuracy.

Figure 2:
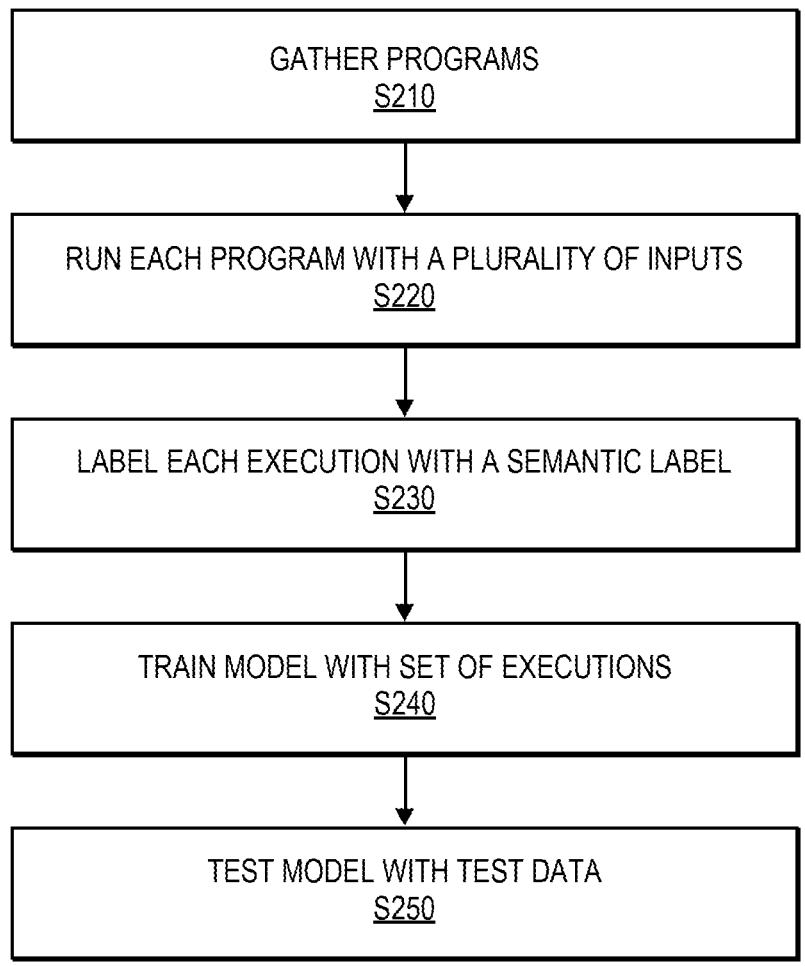
FIG. 2 shows a flow chart of a model training and prediction process according to embodiments.

FIG. 2 shows a flow chart of model training and testing for a deep learning model according to embodiments.

In step 210, a set of programs can be gathered for training and testing the deep learning model. Programs can be collected from existing code repositories, like coding challenge websites or assignments for large computer science classes. Additionally, or alternatively, the programs can be generated. For example, a computer can take an existing program and mutate it to generate other programs. In order to mutate a program, the computer may have rules to change the syntax of a program without changing the semantics of the program. In this way, a small set of programs can be used to generate a larger set of programs for training and testing the deep learning model.

In step 220, a dataset can be generated from the programs. The dataset may comprise a plurality of execution traces for each of the computer programs. Each program may be run with different inputs, and an execution trace may be collected for each execution of each program. Each execution trace in the plurality of execution traces is generated with randomly generated inputs. Alternatively, the inputs may be selected to maximize branch coverage. The execution traces are a record of what was in memory at each time step of the program, in particular the value of each variable. The execution traces can thus provide a record of how each program operated. The execution traces for each program may also be included in the dataset.

In step 230, the dataset can be labeled with semantic labels. Each program in the dataset may be labeled with the semantics of the program. In some embodiments, the dataset may comprise the execution traces of the program, and each execution trace may be labeled with the semantics of the program. Semantic labels may include the program functionality. For example, one set of semantic labels for word processing programs may be "spell-checking", "grammar checking", and "capitalization checking". In some embodiments, the programs and/or execution traces may be manually labeled. The dataset can also be divided into a training dataset, a testing dataset, and a validation dataset. The training dataset may be used to train the deep learning model. The testing dataset and the validation dataset may be used to test the deep learning model.

In step 240, the deep learning model may be trained on a training subset of the dataset comprising the labeled programs (or labeled execution traces). Training may be done with a process described in FIG. 3.

In step 250, the one or more deep learning models can be tested with a testing subset of the dataset comprising the execution traces of the labeled programs. The one or more deep learning models may output predictions about the semantic labels of the programs in the dataset.

Figure 3:
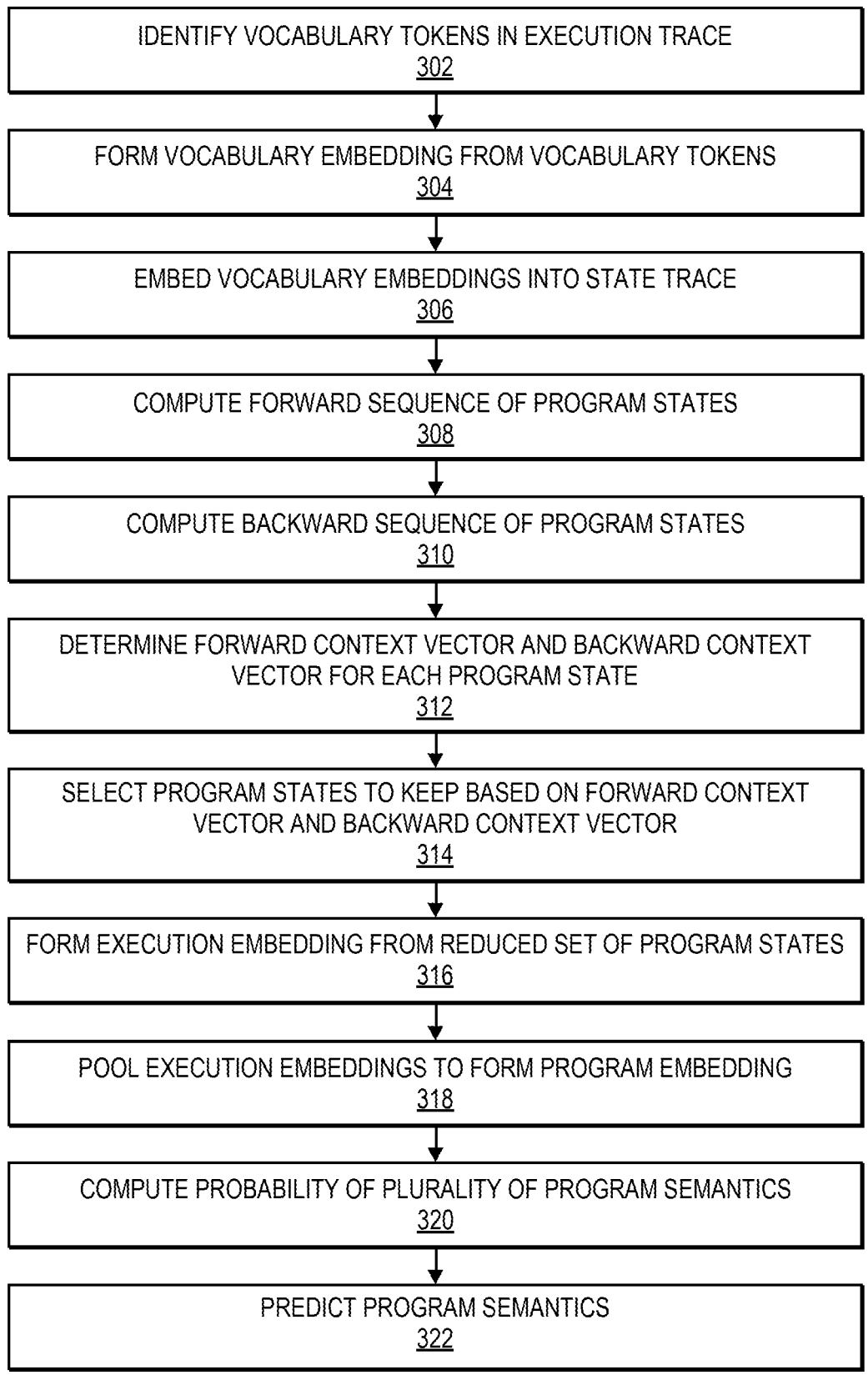
FIG. 3 shows a flow chart of a semantics prediction model according to embodiments.

FIG. 3 shows a flow diagram of analyzing a program using a deep learning model according to embodiments. The process is performed with a deep learning model as described in FIG. 1. The inputs to the deep learning model may be a set of execution traces for a plurality of programs. The programs may be labeled with semantics labels. The dataset of input data may be generated by a process of FIG. 2

In step 302, a deep learning model can identify vocabulary tokens in execution traces. An execution trace may be a log of information about the execution of a program, and may be divided into segments that represent the state of a computer at each step through the execution of a program. Each state may then comprise variable values. Each vocabulary token may be a variable value. The vocabulary tokens can be identified, for example, based on locations in memory. An execution may comprise m states, each state comprised of n vocabulary tokens.

In step 304, the deep learning model can form vocabulary embeddings from the vocabulary tokens. Each vocabulary embedding may be a vector encoding the variable value.

This can be done with a plurality of recurrent neural networks (RNNs). The output of the last hidden layer of a recurrent neural network may be the vocabulary embedding.

In step 306, the deep learning model can embed the vocabulary embeddings into a state embedding vector with a first recurrent neural network RNN1. The sequence of vocabulary tokens for each program state can be run through the first recurrent neural network, or a plurality of copies of the first recurrent neural network, and then the final hidden state of the of RNN1 can be the embedding vector. The variable $u_{e\_s\_v_n}$ can represent the value of the n-th variable $v_n$ of the s-th program state in the e-th execution trace, and $h_{e\_s\_v_n}$ is the resulting hidden state of the RNN. Then the following equations demonstrate how the embedding of s-th program state in e-th execution can be computed, in the recurrent neural network RNN1, given the vocabulary embedding and the embedding of the previous token.

An intermediate state embedding, $h_{e\_s\_v_1}$, can be computed using RNN1, with the vocabulary token of the state, $u_{e\_s\_v_1}$, as input. The other input, $h_{e\_s\_v_0}$, may be an initial vector. The values of the initial vector may be randomly generated.

$$h_{e\_s\_v_1} = RNN1(h_{e\_s\_v_0}; u_{e\_s\_v_1})$$

Subsequent intermediate state embeddings can be computed using the vocabulary embedding and the embedding of the previous token. For example, the second intermediate state embedding, $h_{e\_s\_v_2}$, may be the output of RNN1 with the first intermediate state embedding $h_{e\_s\_v_1}$ and the second vocabulary token, $u_{e\_s\_v_2}$, as inputs.

$$h_{e\_s\_v_2} = RNN1(h_{e\_s\_v_1}; u_{e\_s\_v_2})$$

$$\ldots$$

$$h_{e\_s\_v_n} = RNN1(h_{e\_s\_v_{n-1}}; u_{e\_s\_v_n})$$

The final output, $h_{e\_s\_v_n}$ may then represent the entire state and may be referred to as $h_{e\_s}$.

In step 308, the deep learning model can compute a forward sequence of program states. This may be a first step in a process of determining a reduced set of program states. Computing the forward sequence can be done with a bi-directional neural network. Given the state embeddings h of an execution e ($h_{e\_1}$ to $h_{e\_n}$), the following equations demonstrate how a sequence of hidden states $\overrightarrow{H_{e\_1}}$ to $\overrightarrow{H_{e\_m}}$ can be computed with a forward RNN. A first component of the forward sequence, $\overrightarrow{H_{e\_1}}$, can be computed using the forward RNN, with the first state embedding, $h_{e\_1}$, as input. The other input, $\overrightarrow{H_{e\_0}}$, may be an initial vector. The values of the initial vector may be randomly generated.

$$\overrightarrow{H_{e\_1}} = \text{forward\_RNN}(\overrightarrow{H_{e\_0}}; h_{e\_1})$$

Subsequent components of the forward sequence can be computed using the state embedding and the previous component of the forward state. For example, the second component of the forward sequence, $\overrightarrow{H_{e\_2}}$, may be the output of forward RNN with the first component of the forward sequence, $\overrightarrow{H_{e\_1}}$, and the second program state, $h_{e\_2}$, as inputs.

$$\overrightarrow{H_{e\_2}} = \text{forward\_RNN}(\overrightarrow{H_{e\_1}}; h_{e\_2})$$

$$\ldots$$

$$\overrightarrow{H_{e\_m}} = \text{forward\_RNN}(\overrightarrow{H_{e\_m-1}}; h_{e\_m})$$

In step 310, the deep learning model can compute a backward sequence of program states using the same bi-directional neural network. Similarly, the following equations compute components of the backward sequence $\overleftarrow{H_{e\_1}}$ to $\overleftarrow{H_{e\_m}}$ by processing the state embeddings in the other direction. A first component of the backward sequence, $\overleftarrow{H_{e\_1}}$, can be computed using the backward RNN, with the last state embedding, $h_{e\_m}$, as input. The input $\overleftarrow{H_{e\_0}}$ may be an initial vector, and the values of the initial vector may be randomly generated.

$$\overleftarrow{H_{e\_1}} = \text{backward\_RNN}(\overleftarrow{H_{e\_0}}; h_{e\_m})$$

$$\overleftarrow{H_{e\_2}} = \text{backward\_RNN}(\overleftarrow{H_{e\_1}}; h_{e\_m-1})$$

$$\ldots$$

$$\overleftarrow{H_{e\_m}} = \text{backward\_RNN}(\overleftarrow{H_{e\_m-1}}; h_{e\_1})$$

The last component of the backward sequence, $\overleftarrow{H_{e\_m}}$ may be computed with the previous component of the backward sequence, $\overleftarrow{H_{e\_m-1}}$, and the first state embedding $h_{e\_1}$.

In step 312, the deep learning model can determine a forward context vector for each state from the components of the forward sequence and a backward context vector from the components of the backward sequence. The forward context vector can represent how a program state fits in to the context of the programs states that came before the program state. The backward context vector can do the same for the program states that come after the program state. For a state embedding $h_{e\_s}$, the following equations can define the context vector $C_f$ and $C_b$.

$$C_f(h_{e\_s}) = \text{max\_pooling}(\overrightarrow{H_{e_1}}; \overrightarrow{H_{e_2}}; \overrightarrow{H_{e\_s-1}})$$

$$C_b(h_{e\_s\_v_n}) = \text{max\_pooling}(\overleftarrow{H_{e_1}}; \overleftarrow{H_{e_2}}; \ldots; \overleftarrow{H_{e\_m-s}})$$

The forward context vector can be a max pooling of a subset of components of the forward sequence, in particular the first s−1 components, comprising information from the first s−1 program states. The backward context vector can similarly be a max pooling of a subset of components of the backward sequence, with the first m−s components of the backward sequence, comprising information from the last m−s program states. The max pooling function can take the largest values over all forward sequence components (or backward sequence components) to capture the most relevant information about the states that come before and after a particular state for the contextual vector.

In step 314, the deep learning model can determine program states to include in the reduced set of program states based on at least the forward context vectors and the backward context vectors. Determining which program states to include in the reduced set of program states can be performed by a multi-layer perceptron. The resultant pooling vectors can be concatenated with a particular state embedding, as in the equation below, then used as input to the multi-layer perceptron (MLP). The multi-layer perceptron (MLP) may have one single sigmoid output neuron.

$$\text{prediction}=\text{MLP}(C_f \oplus C_b \oplus h_{e\_s\_v_n})$$

If the output of the MLP is above a threshold, the program state can be retained. For example, if the output is greater than 0.5, the state may be added to the reduced set of program states. A higher threshold may be selected to result in greater reduction in program states. By completing this process for each program state in the set of program states for each execution, a reduced set of program states can be formed. Embodiments may reduce the number of program states so there are, for example, 50% fewer states in the reduced set of program states than in the plurality of program states In step 316, the deep learning model can form an execution embedding for each execution with a second recurrent neural network (RNN2), or a plurality of copies of the second recurrent neural network, using the reduced set of program states. The reduced set of program states can be the inputs for the second RNN. The execution embedding may then be the last hidden state of the second RNN.

In step 318, the deep learning model can pool the execution embeddings from the program to form a program embedding. In some embodiments, the pooling may be done with a max pooling function. Grouping the execution embeddings into the program embedding further abstracts the meaning of each execution trace to capture a high level amount of information about the program.

In step 320, the deep learning model can compute probabilities of program semantics, using a softmax layer. The deep learning model may additionally, or alternatively return probabilities for a list of program functionalities. For example, for a program, the softmax layer may output a vector (0.94, 0.02, 0.03, 0.01) indicating a 94% probability that the program is a string reversal program, 2% probability that the program is an array averaging program, 3% probability that the program is an array $k^{th}$ largest element program, and 1% probability that the program is an array max difference program. In some embodiments, a different function can be used to predict the probabilities. Other embodiments may use other activation functions. If the classification is a binary classification (e.g., if there are only two semantic classifications), other activation functions such as ReLU or sigmoid functions may be used instead of the softmax function.

In step 322, the deep learning model can predict program semantics. The deep learning model can use the output of the softmax function and predict the program semantics. For example, if the softmax function outputs a value indicating that there is a 94% probability that the program is a string reversal program, the deep learning model can predict that the program is a string reversal program. In some embodiments, predicting semantics of the program comprises returning a probability of one of a list of program functionalities.

Figure 4:
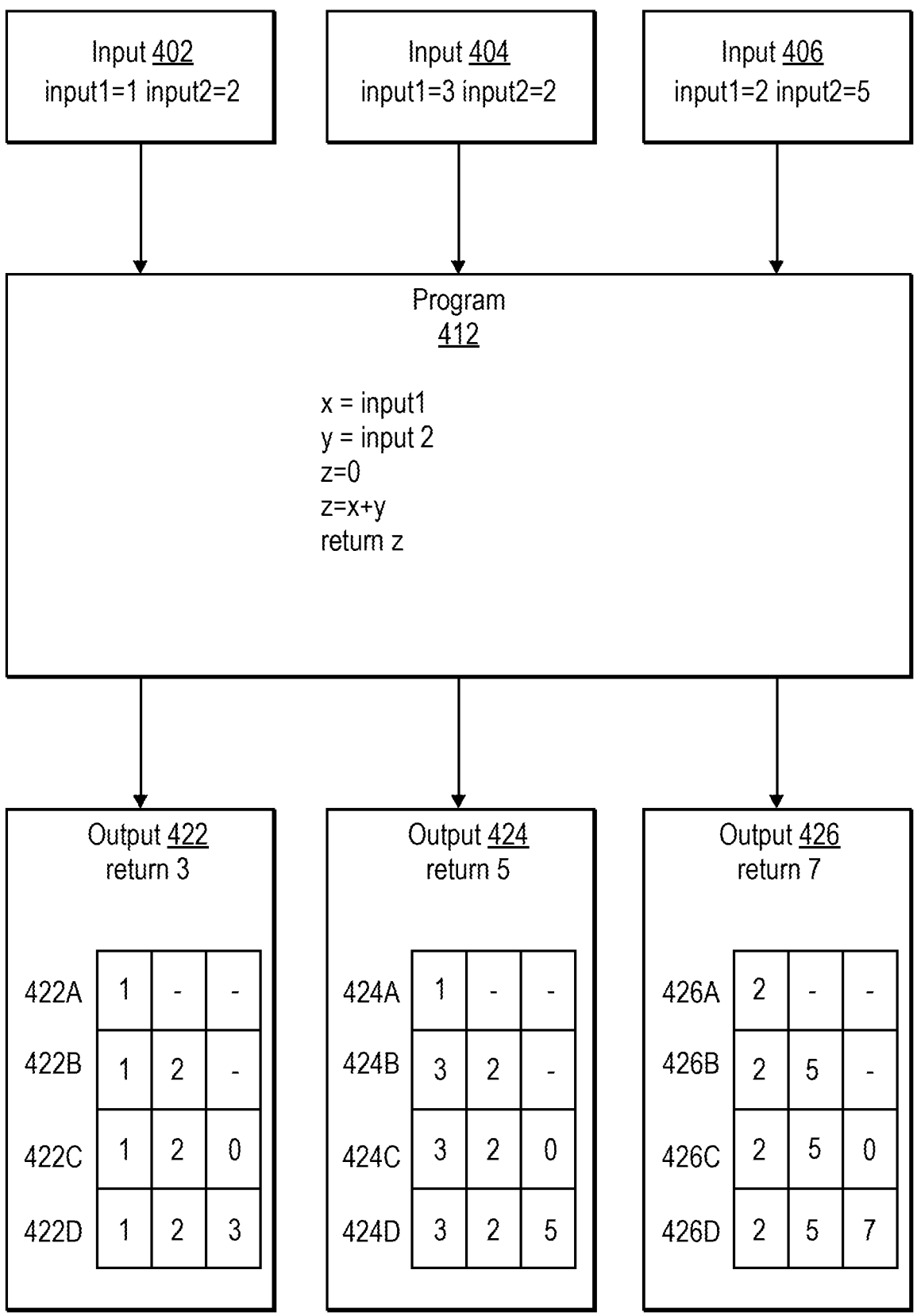
FIG. 4 shows examples of execution traces.

FIG. 4 shows an example of a plurality of execution traces that can be generated from a program. The execution traces can then be analyzed by a deep learning model according to embodiments to determine the semantics of the program.

Program 412 may be any computer program, written in an appropriate computer programming language. In this example, program 412 is written in Python and computes the sum of two numbers. First, program 412 takes in input1 and assigns it to the variable x. Then program 412 takes in input2 and assigns it to the variable y. Then program 412 computes the sum of x and y, assigns the sum to the variable z, and then returns z.

Input 402, input 404, and input 406 are three example inputs to program 412, each defining a value for input1 and input2. More inputs, and thus more generated execution traces, can increase the accuracy of semantic predictions as they can capture more details about the operation of the program. In some embodiments, the inputs may be randomly generated inputs.

As program 412 processes each input 402, 404, 406 to generate an output 422, 424, 426, respectively, an execution trace can be formed. For example, output 422 comprises the value 3 and an execution trace. State 422A of the execution trace shows the state of memory after the execution of the first line of the program. Only the location in memory assigned to the variable x may be filled, and it may store the value 1 (the value of input1). Other locations in memory may be blank (e.g., may store null values). There may be locations in memory preallocated to the three variables that will be used over the course of the program, or memory locations may be allocated as needed throughout execution. For simplicity, the case where locations are preallocated is shown. At state 422B, the variable y is assigned to the value of input2, or 2. The location for variable z is still left blank. At state 422C, the variable z is instantiated with the value 0, then at state 422D, the variable z is assigned to the value 3. Program 412 then returns the value stored in variable z, which is 3. The execution traces for output 424 and 426 may be generated in a similar way.

The elements of the outputs 422, 424, 426 can be labeled according to the architecture diagram of FIG. 1. The execution trace of output 422 may be denoted as execution trace $u_1$, output 424 may be denoted as $u_2$, and output 426 may be denoted as $u_n$. State 422A may be denoted as state $u_{1\_1}$ through state 422D denoted $u_{1\_m}$. Similarly, state 426A may be denoted $u_{n\_1}$ through state $u_{n\_m}$ for state 426D. Each variable of each state may be labeled as well. The variables of state 422D, for example, can be labeled as $1=u_{1\_m\_v_1}$, $2=u_{1\_m\_v_2}$, through $3=u_{1\_m\_v_n}$.

When the execution traces of output 422, 424, 426 are input into a deep learning model according to embodiments, the first step may be forming a token embedding with the value of each variable at each state. In the example of output 422, there may be 12 tokens in the execution trace, corresponding to the three variable values at each of the four states. In another embodiment, there may only be 9 tokens, corresponding to the number of non-null variable values over all states. Then in the state embedding layer, an embedding may be generated for each state from the token embeddings. For example, a state embedding can be generated for the values of x, y, and z at state 422A. In the state reduction layer, the total number of states can be reduced. For example, the embeddings of states 422A and 422B may be removed, because state 422C captures all of the information of state 422A and includes the generation of all variables. In some embodiments, even though state 422D captures all of the information of state 422C, the embedding of state 422C may not be removed, because the deep learning model may distinguish between states that include only input data and states that include computed data. Other embodiments may retain and discard different states from the same execution trace, depending on the training of the deep learning model. In the execution embedding layer, the embeddings of states that remain after the state reduction layer (e.g., states 422C and 422D) can be grouped into an execution embedding.

FIG. 5A and FIG. 5B show tables of example datasets for training and testing. Data may include different programs designed to complete a number of tasks or benchmarks. The data may be collected, for example, from coding challenge websites or code repositories. FIG. 5A shows data that can be labeled based on the function it is meant to complete, such as averaging over an array or reversing a string. FIG. 5B shows data labeled based on compiler optimization tasks that can be done with the data. For example, the compiler optimization tasks may include dead code elimination and hoisting.

Data can then be divided into a training set, a validation set, and a testing set. The dataset may be divided such that there are an approximately equal number of programs in the validation set and the testing set. For example, in FIG. 5A, there can be approximately 10,000 programs in the training set, 1000 programs in the validation set, and 1000 programs in the testing set.

In order to prepare the input data for deep learning models, a compiler framework (e.g., Microsoft Roslyn) may be used to both parse ASTs and monitor executions. In some embodiments, each program may be run with a set of twenty inputs that are randomly generated. In other embodiments, more or fewer inputs may be used, and the inputs may or may not be randomly generated. The execution traces for each program may be part of the dataset for the evaluation framework. The model may be implemented in a machine learning framework such as Tensorflow or Keras, and can be implemented from scratch or on top of existing architectures. Before training, some hyperparameters may be determined such as the number of recurrent layers (e.g., 1), the number of hidden units in the recurrent layer (e.g., 100), the embedding dimensions for each input token (e.g., 100), the optimizer (e.g., the Adam algorithm), and the maximum value for normalizing the gradient when clipping (e.g., 0.9).

Figure 6:
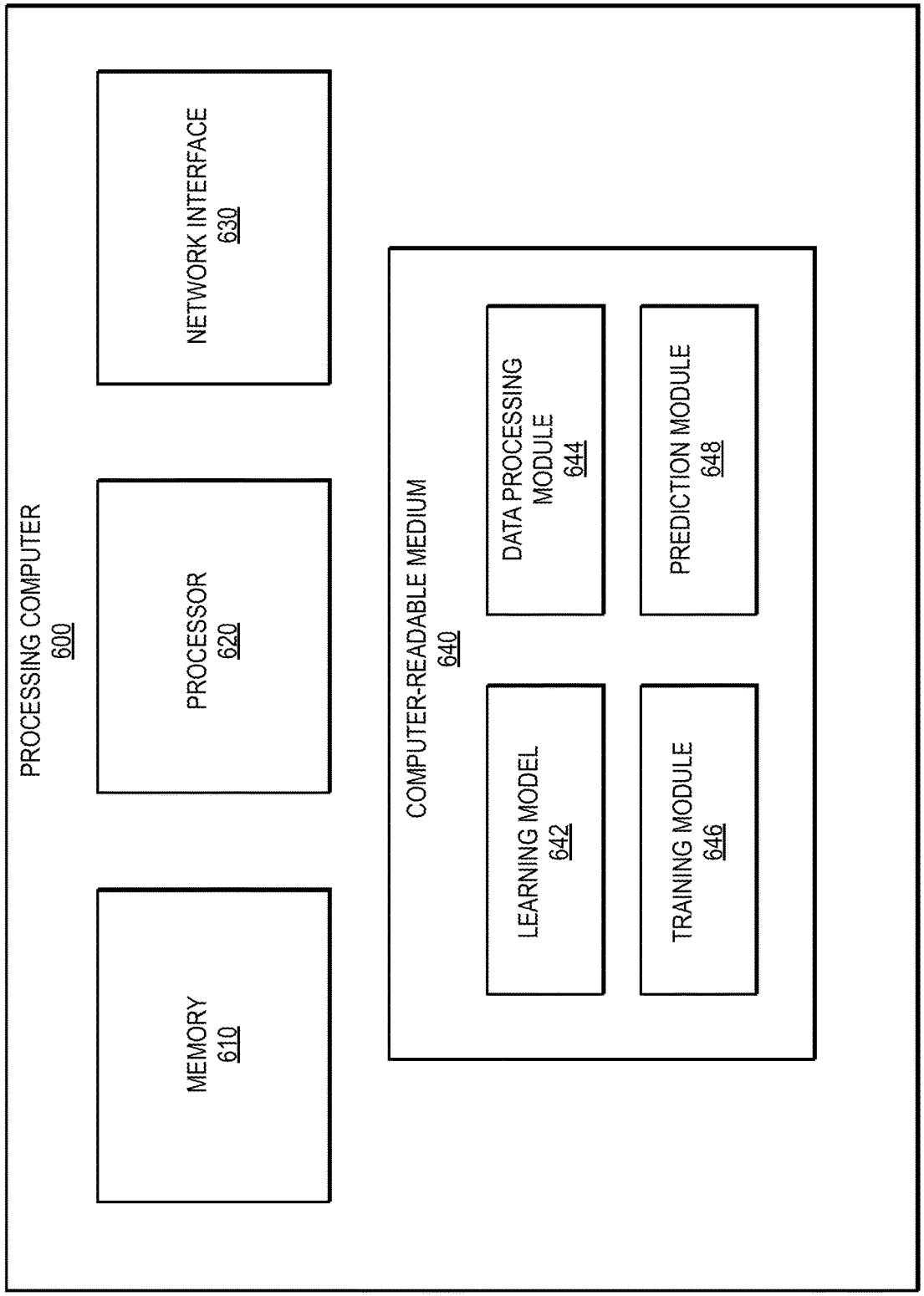
FIG. 6 shows a block diagram of a processing computer according to embodiments.

FIG. 6 shows a block diagram of a processing computer 600 according to embodiments. The processing computer may comprise a memory 610, a processor 620, a network interface 630, and a computer-readable medium 640. The computer-readable medium 640 may store code executable by the processor 620 for implementing some or all of the functions of processing computer 600 described herein. Computer-readable medium 640 may include a learning model 642, a data processing module 644, a training module 646, and a prediction module 648.

The memory 610 may be implemented using any combination of any number of non-volatile memories (e.g., flash memory) and volatile memories (e.g., DRAM, SRAM), or any other non-transitory storage medium, or a combination of media.

The processor 620 may be implemented as one or more integrated circuits (e.g., one or more single core or multicore microprocessors and/or microcontrollers). The processor 620 may be used to control the operation of the processing computer 600. The processor 620 can execute a variety of programs in response to program code or computer-readable code stored in memory 610. The processor 620 may include functionality to maintain multiple concurrently executing programs or processes.

Network interface 630 may be configured to connect to one or more communication network to allow processing computer 600 to communicate with other entities. For example, processing computer 600 can interact with computers to receive code and/or programs from other computers, such as a computer of a code repository. Network interface 630 may allow other computers to use processing computer 600 to analyze programs. For example, communication with a code repository can be direct, indirect, and/or via a API.

Computer-readable medium 640 may comprise one or more non-transitory media for storage and/or transmission. Suitable media include, as examples, a random access memory (RAM), a read only memory (ROM), a magnetic medium such as a hard-drive, or an optical medium such as a CD (compact disk) or DVD (digital versatile disk), flash memory, and the like. The computer-readable medium 640 may be any combination of such storage or transmission devices.

Computer-readable medium 640 may comprise code, executable by the processor 620, for implementing a method including receiving a plurality of execution traces of a program, each execution trace comprising a plurality of variable values. The method also includes encoding, by a first recurrent neural network, the plurality of variable values to generate a plurality of program states for each execution trace, then determining, by a bi-directional recurrent neural network, a reduced set of program states for each execution trace from the plurality of program states. The method also includes encoding, by a second recurrent neural network, the reduced set of significant program states to generate a plurality of executions for the program. The method also includes pooling the plurality of executions to generate a program embedding and predicting semantics of the program using the program embedding.

Learning model 642 may be a deep learning model. The learning model 642, in conjunction with the processor 620, may receive data including execution traces from a program or a plurality of programs and may determine semantic labels for the program or plurality of programs. The semantic labels may include program semantics and program functionalities. Program functionality may refer to a problem solved by the program, while program semantics refers to the way in which the problem is solved by the program. During training of the learning model 642, the learning model may receive training data from the training module 646.

Data processing module 644, in conjunction with the processor 620, can process data prior to being sent into the learning model 642. The data processing module 644 can process program data before it is used as inputs for the learning model 642. The processing may include, for example, converting a program to a different format (e.g., Python to C#) and dividing up an execution trace into vocabulary tokens. The data processing module 644 can run a program with a plurality of inputs to generate a plurality of execution traces. The execution traces can be generated using random testing. For example, 50 test cases may be used to generate execution traces.

Training module 646, in conjunction with the processor 620, may train the learning model 642. The training module 646 may receive execution traces, and the execution traces may have semantic labels. The training module 646 may receive execution traces from data processing module 644. The training module 646 may also divide the execution traces into a training dataset, a testing dataset, and a validation dataset.

Prediction module 648, in conjunction with the processor 620, may receive a program with unknown semantics that can be classified by the learning model 642. The prediction module 648 may receive execution traces of the unknown program from the data processing module 644, and then provide the execution traces to the learning model 642. The prediction module 648 may also form predictions for the program from the output of the learning model 642.

Embodiments may also include an evaluation framework for comprehensively evaluating deep learning models. Embodiments may be a framework for standardizing the evaluation of program embeddings and measuring how well deep learning models can learn to represent program semantics. The framework may comprise a dataset, one or more predication tasks, and one or more evaluation metrics.

The evaluation framework may include a method that comprises labelling a computer program dataset with semantics labels, wherein the computer program dataset comprises a plurality of computer programs; training one or more deep learning models with a first subset of the computer program data; testing the one or more deep learning models with a second subset of the computer program data to generate a semantic prediction for each computer program in the computer program data; and evaluating one or more metrics for the one or more deep learning models by metrics.

The computer program data may further comprise one or more execution traces for each computer program. In some embodiments, the semantic prediction may be a functionality classification. In other embodiments, the semantic prediction may be a semantics classification.

One metric may be robustness, and evaluating robustness of a deep learning model can comprise: generating a test set of computer programs that were correctly predicted by the deep learning model; applying a local transformation to each computer program in the test set to generate a mutated test set, wherein each computer program in the mutated test set retains the semantics of the associated computer program in the test set; testing the deep learning model with the mutated test set to generate a new sematic prediction for each computer program in the mutated test set; repeating the above steps until there are no computer programs in the test set; and calculating a robustness score based on the number of changes between the original computer program and the last computer program.

The dataset may comprise many programs. The dataset may be, for example, those described in FIG. 5A and FIG. 5B. For example, there may be more than 10,000 programs in the dataset. The programs may be obtained, for example, from a public coding platform (e.g., coderbyte, hackerrank), and each program may be written to solve a particular coding problem. Each program may have been written in a particular coding language, such as C#. In some embodiments, problems may be selected that are relatively easy for models to start with including reversing strings, computing the average value, $k^{th}$ largest member, maximum difference between two elements of an array, counting the number of balanced parenthesis and printing a chessboard. The dataset may then be analyzed and labelled. The analysis and labelling may be done manually. The labelling can be on the basis of operational semantics, e.g., a way to describe the data flow during the execution. Certain kinds of variations may be allowed, such as extra variables used for temporary storage of intermediate results. The whole dataset may then be split into a training set, a validation set, and a test set. In some embodiments, the number of programs in the training set may be significantly more than in the validation set and/or the test set.

In some embodiments, the framework may include two prediction tasks for the deep learning models to complete: functionality and semantics classification. Models may be used to predict the category a particular program falls into based on its functionality/semantics, a similar task to image classification. Functionality classification may serve the purpose of validating the deep learning models' capability of learning more than shallow, surface-level syntactic features.

In some embodiments, the framework may include three metrics, accuracy, scalability, and robustness, to evaluate the performance of deep learning models. Accuracy can measure the percentage of correct predictions. Scalability can measure models' ability to scale programs with growing size (e.g., number of lines in program, number of lines in execution trace).

For robustness, new programs may be generated by applying local transformation rules on previously correctly predicted programs. The transformations may be semantically preserving, meaning model's prediction should not change because of the syntactic alterations. However, if a model does not learn the program semantics at a deeper level, the prediction is likely to be unstable against such variations. Transformation rules may not change the input formats of deep learning models according to embodiments, because fabricated programs may be semantically equivalent to their original counterparts, therefore, program statements/expression may be randomly injected in the original program that cause the semantics to differ.

In order to prepare the input data for all deep models, a compiler framework (e.g., Microsoft Roslyn) may be used to both parse ASTs and monitor executions. In particular, each program may be run with a set of twenty inputs that are randomly generated. The execution traces for each program may be part of the dataset for the evaluation framework. The models may be implemented in a machine learning framework such as Tensorflow, either completely from scratch or on top of existing architectures. Before training, some hyperparameters may be unified across all models such as the number of recurrent layers (e.g., 1), the number of hidden units in the recurrent layer (e.g., 100), the embedding dimensions for each input token (e.g., 100), the optimizer (e.g., the Adam algorithm), the maximum value for normalizing the gradient when clipping (e.g., 0.9), etc.

Figure 7:
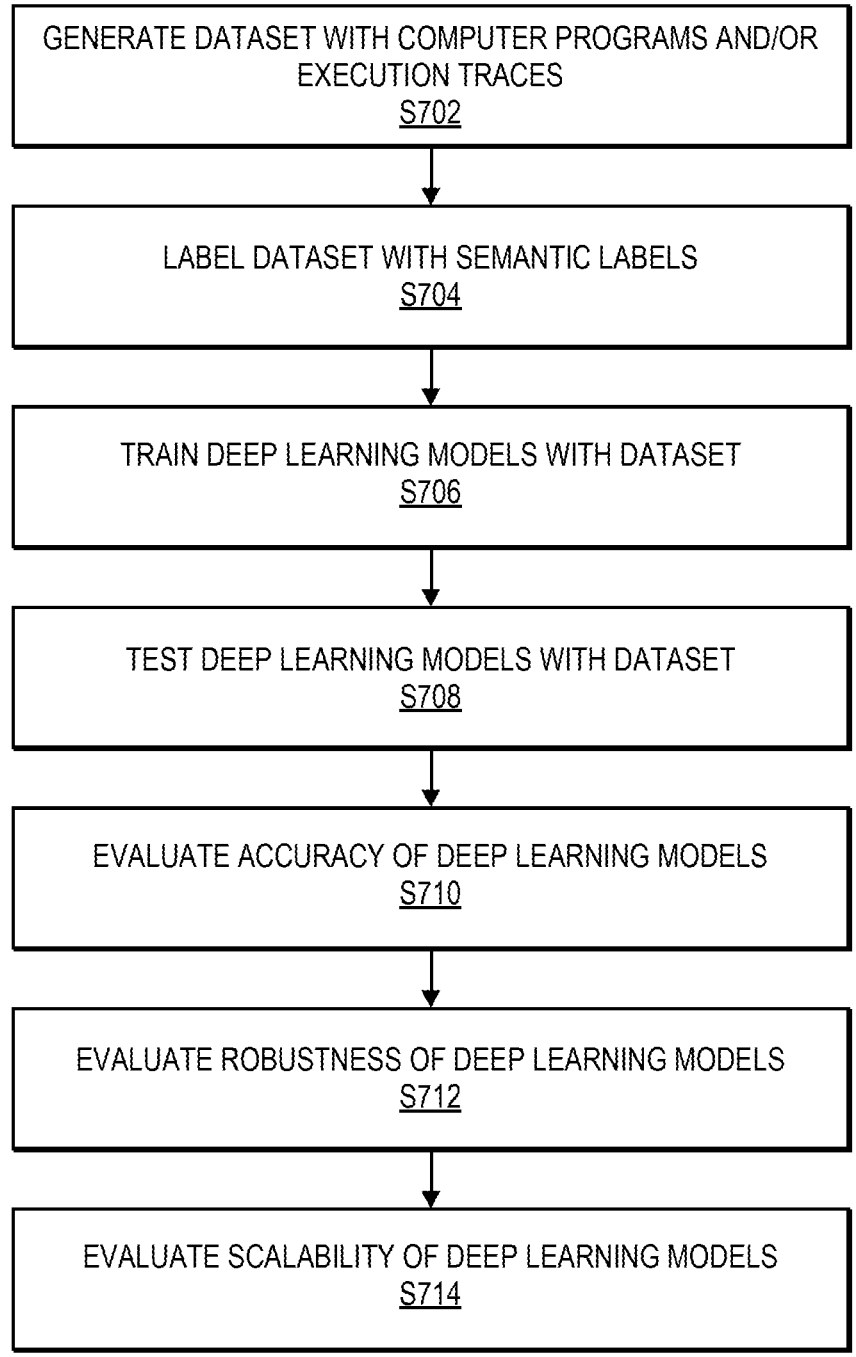
FIG. 7 shows a flow chart of an evaluation framework according to embodiments.

FIG. 7 shows a flow chart of model training, testing, and evaluation using the evaluation framework.

In step S702, a dataset can be generated. The dataset may comprise a plurality of computer programs. The plurality of programs may be run with different inputs, and execution traces may be collected for each execution of each program. The execution traces are a record of what was in memory at each time step of the program, in particular the value of each variable. The execution traces may thus provide a record of how each program operated. The execution traces for each program may also be included in the dataset.

In step S704, the dataset, including programs and/or execution traces, can be labeled with semantic labels. Semantic labels may include the functionality of the program. These may be manually labeled.

In step S706, one or more deep learning models may be trained on a training subset of the dataset comprising the labeled execution traces and/or the labeled programs.

In step S708, the one or more deep learning models can be tested with a testing subset of the dataset comprising the labeled execution traces and/or the labeled programs. The one or more deep learning models may output predictions about the semantic labels of the programs in the dataset.

In step S710, the accuracy of the results from the one or more deep learning models can be evaluated. The accuracy of a model can be based on the percentage of accurate predictions returned by the model.

In step S712, the robustness of the one or more models can be evaluated. For each model, the programs that were correctly predicted can be collected into a test set. Local transformation rules can then be randomly applied to each program in the test set generate a mutant. The local transformation rules may preserve the semantics and functionality of the original program. The mutated programs can form a mutated test set for each program, and then each model can be tested with the respective mutated test set. The score of each correctly predicted mutant can be calculated based on the number of discrepancies (e.g., the number of tokens) between the original program and current version of the mutant. Mutants that are predicted incorrectly may have a score of 0 and can be removed. Mutants that have been predicted correctly can be added to a new test set, and the process of applying local transformations and testing the one or more models can repeat. The process can continue until there are no mutants left in the test set, at which point the robustness score for each model can be calculated based on the scores of all mutants tested. For example, the robustness score may be calculated as the average over the scores among all mutants.

In step S714, the scalability of the one or more models can be evaluated. Scalability can measure how metrics for each model change with the increasing program size (e.g., number of lines of program, length of execution traces). Scalability for embodiments that include a state reduction layer, such as DyPro, may also measure the reduction of program states. For example, DyPro may discard more than 50% of the program states in a particular execution.

Figure 8:
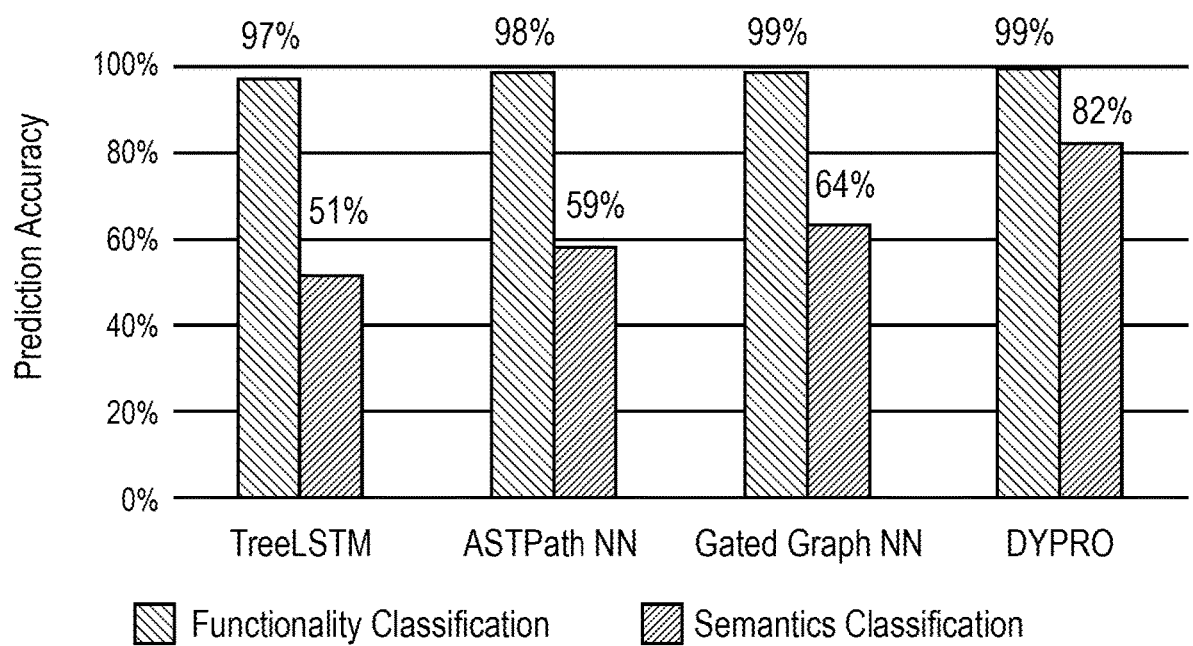
FIG. 8 shows a graph of prediction accuracy for several semantics predicting models.

FIG. 8 shows a bar graph of prediction accuracy, for both functionality classification and semantics classification, for a variety of learning models including an embodiment (DyPro). Prediction accuracy is the percentage of prediction tasks that a model is able to perform successfully out of the total number of prediction tasks. Each of the models tested may have a high degree of accuracy with respect to functionality classification. However, differences between each model because more apparent when comparing semantics classification accuracy. The TreeLS™ model, the ASTPath neural network, and the Gated Graph neural network all perform below 65% prediction accuracy. The DyPro model according to embodiments, however, achieves 82% prediction accuracy for semantics classification. Thus the DyPro model is more effective at predicting program semantics than other models.

Figure 9:
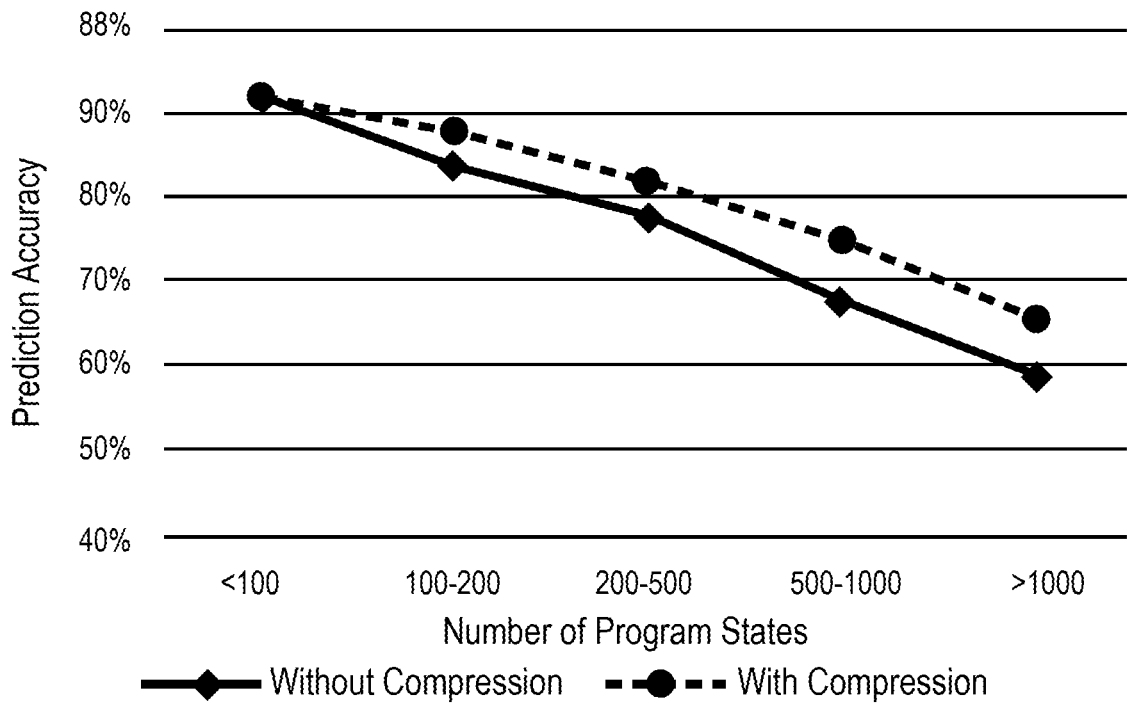
FIG. 9 shows a graph of prediction accuracy as a function of number of program states for a model according to embodiments.

FIG. 9 shows a graph of DyPro prediction accuracy as a function of number of program states, both with and without compression. In a deep learning model without compression, the state reduction layer does not remove state embeddings. In a model with compression, the state reduction layer removes state embeddings that are not needed when optimizing prediction accuracy. For small programs with only a few number of program states, both models with and without compression perform approximately the same and with a high level of prediction accuracy. This may be because with a smaller number of program states, there are fewer states than can be removed, meaning there is less of a difference between compression and no compression. As the number of program states increases, both models decrease in prediction accuracy. This can be understood as programs with more program states are likely longer and more complex an thus have more complicated semantic meanings. A model with compression decreases in accuracy less than a model without compression. Thus a model that removes unnecessary program states can be more robust to programs with increased program states because the eventual number of states considered by the model.

Figure 10:
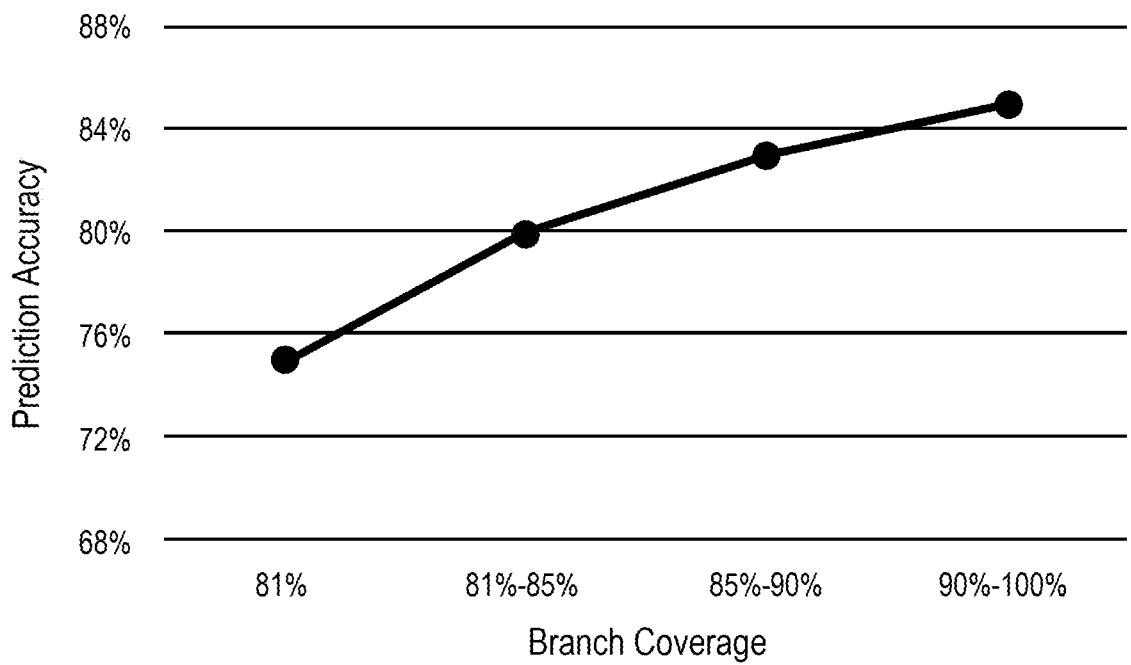
FIG. 10 shows a graph of prediction accuracy as a prediction of branch coverage for a model according to embodiments.

FIG. 10 shows a graph of DyPro prediction accuracy as a function of branch coverage. Branch coverage is a measure of the amount of code in a program that is tested by a test case or set of test cases. Branches are introduced in code through structures that provide multiple outputs, such as "if-else" statements. For example, consider a program that takes in an number as input and then outputs "True" if the input is an even number and outputs "False" if the input is an odd number. Testing the program with only one number, or all even numbers (or all odd numbers) will only achieve branch coverage of 50%. That is, the test inputs only activate one of the two branches of the if-else statement. Testing the program with both even and odd numbers can yield a branch coverage of 100%. Random testing (randomly generating test inputs) can result in high branch coverage for large sets of test data. As shown in FIG. 10, prediction accuracy of DyPro increases with increasing branch coverage. This may be because with increased branch coverage exposes more of the functionality of the program and thus leads to a clearer picture of the semantics of the program.

FIG. 11 shows a table of results of semantic analysis for several learning models, including a Gated Graph neural network, an ASTPath neural network, a TreeLS™, and DyPro according to embodiments. The accuracy is evaluated for a variety of tasks that may be done by a complier, which can perform a variety of tasks that depend on understanding program semantics. The $F_1$ score can also be computed for each task. $F_1$ score is the weighted average of precision (e.g., the ratio of correctly predicted programs to the total predicted programs with that label) and recall (e.g., the ratio of correctly predicted programs to the total number of programs with that label). $F_1$ may be calculated with the formula $$F_1 = 2 \cdot \frac{\text{precision} \cdot \text{recall}}{\text{precision} + \text{recall}}$$

One task may be constant and variable propagation. For each program in the dataset, unnecessary variables can be identified which otherwise can be replaced by constants. The declarations of such variables can be labeled as positive. Then extra declarations can be injected that take values of existing variables, passed onto to later statements, and labeled as positive. All other declarations in the program to be negative. The goal of the task is to predict the unnecessary declarations a compiler would remove with constant or variable propagation.

Another task is dead code elimination. Similarly, identify statements that only write to variables that are not live (according to a liveness definition) at the point of update. As a result, those statements can be given positive labels. Extra variables can be introduced at a random location which may not be used or new statements can be incorporated that write to existing variables at a location where variables are not live, in which case the new statements are also labeled positive. Finally all other non-control statements can be labeled as negative. The task is to predict the dead non-control statements compiler would have eliminated.

Hoisting is another task that can be evaluated. Hoisting means taking loop invariants out of loops, thus improving the runtime performance by executing the invariants only once instead of in each iteration. Likely loop invariant candidates can be proposed (e.g., using Daikon), then false positives can be removed (e.g., with Microsoft Code Contracts). Programs written in Java and Python can be translated to C#. Then a statement in the loop body can be added to assign an invariant expression to a new variable. Because the variable will receive the same value at each iteration of the loop, the assignment can be labeled as positive (e.g., statements that should be hoisted out of the loop). For negative samples, the invariant can be mutated; a mutant that is confirmed to be a non-invariant (via random testing) can be picked to generate the assignment statements. As an example, consider an implementation of Stack. Given the two fields in the class: object[ ] array, the actual data structure for storing the elements and int topOfStack, the index of the top element, Daikon may propose this.array[this.topOfStack+1]==null as an invariant across method boundaries in the class (e.g. void push(object x), void pop( ), object top( ) etc.). After the expression is checked and confirmed as an invariant, a statement var obj=this.array[this.topOfStack+1] can be introduced as a positive example and var obj=this.array[this.topOfStack−1] as a negative example.

Induction variable elimination is another task that can be evaluated. Induction variable elimination refers to combining multiple induction variables into one. Loops of two induction variables can be considered. In some implementations, these loops can account for more than 95% of the programs having multiple induction variables in the dataset. Given a loop of two induction variables x and y, we can detect and confirm their relationship f such that y=f(x) holds at each loop iteration. Next we can replace all occurrences of y with $f^{-1}(y)$ in the loop body excluding the incrementors of y. Since x and $f^{-1}(y)$ will be evaluated to the same value, the actual usage of x and y may be interchangeable. Hence, we can assign a positive label to the loop indicating its induction variables can be combined. A minor tweak can help to generate the negative examples. Instead of replacing x with $f^{-1}(y)$, x can be replaced with $g^{-1}(y)$, $g^{-1} \neq f^{-1}$.

For constant and variable propagation, the Gated Graph neural network (GGNN), the TreeLS™, and embodiments (DyPro) all perform well at constant and variable propagation, though DyPro has the highest accuracy. For dead code elimination, TreeLS™ performs less well than the Gated Graph neural network and DyPro. With hoisting, the differences between the accuracy become more apparent. The accuracy of the GGNN drops to 63.8% and the accuracy of TreeLS™ drops to 56.4%. Meanwhile, the accuracy of DyPro remains high at 92.7%. Similarly, with induction variable elimination only DyPro retains an accuracy of 90.3% while GGNN and TreeLS™ are below 60%. This table shows that they are all good at some of the easier tasks, but as the compiler optimization tasks become more difficult, the other models can fail to capture program semantics.

Embodiments of the present disclosure provide a number of advantages. By analyzing multiple executions of a program, a deep learning model can generalize the functionality of a program beyond a specific execution. This in turn can provide a more robust understanding of the program semantics as they are not tied to a particular set of inputs. Execution traces may also allow for dynamic analysis of a computer program, as opposed to static analysis of the program code itself. Dynamic analysis can provide more information about how the program responds to input, which may be important for determining semantics. A deep learning model according to embodiments can be used to analyze unknown code. This can save developers time and resources when working with new information. Embodiments can be used when developing new computer programs, either programs developed by a developer or autonomously. Embodiments can also increase the efficiency of existing programs by identifying code that is semantically redundant, thus saving time and computing resources when executing the program.

Embodiments also represent a technical advantage over other deep learning models that learn program semantics through the use a state reduction layer. Execution traces can become arbitrarily long, depending on the program and the inputs. For example, recursive programs or loops may rapidly increase the length of an execution trace, even for relatively simple inputs. Long execution traces may then slow down a model that is analyzing them. By reducing the number of program states that are analyzed but maintain the semantic information, the deep learning model can scale across large programs and long execution traces and still maintain a relatively high level of accuracy and efficiency. This can provide a better use of computer resources to accomplish the task.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive, or an optical medium such as a CD-ROM. Any such computer readable medium may reside on or within a single computational apparatus, and may be present on or within different computational apparatuses within a system or network.

The above description is illustrative and is not restrictive. Many variations of the disclosure may become apparent to those skilled in the art upon review of the disclosure. The scope of the disclosure can, therefore, be determined not with reference to the above description, but instead can be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving a plurality of execution traces of a program, each execution trace comprising a plurality of variable values, and wherein each execution trace of the program includes a semantic label describing a processing function of the program;
encoding, by a first recurrent neural network, the plurality of variable values to generate a plurality of program states for each execution trace;
determining, by a bi-directional recurrent neural network, a reduced set of program states for each execution trace from the plurality of program states,
wherein determining the reduced set of program states for each execution trace from the plurality of program states comprises:
computing a forward sequence from the plurality of program states;
computing a backward sequence from the plurality of program states;
for each program state in the plurality of program states:
determining a forward context vector from the forward sequence;

determining a backward context vector from the backward sequence;
applying a multi-layer perceptron to predict a necessity of each program state; and
determining, based on a result of the multi-layer perceptron,
whether to include the program state in the reduced set of program states;
encoding, by a second recurrent neural network, the reduced set of program states to generate a plurality of executions for the program;
pooling the plurality of executions to generate a program embedding;
predicting semantics of the program using the program embedding in order to classify the program, wherein the predicted semantics include one or more semantic labels; and
using the predicted semantics of the program to perform a compiler optimization task, wherein the method is optimized to minimize a cross-entropy loss and minimize a number of program states in the reduced set of program states.

2. The method of claim 1, wherein the predicting semantics of the program comprises returning a probability of one of a list of program functionalities.

3. The method of claim 1, wherein there are 50% fewer states in the reduced set of program states than in the plurality of program states.

4. The method of claim 1, wherein each execution trace in the plurality of execution traces is generated with randomly generated inputs.

5. The method of claim 1, wherein determining the forward context vector comprises pooling a subset of components of the forward sequence, the subset of components of the forward sequence comprising information from a first s-1 program states, and wherein determining the backward context vector comprises pooling a subset of components of the backward sequence, the subset of components of the backward sequence comprising information from a last m-s program states.

6. The method of claim 1, wherein the predicting semantics is performed with an output of a softmax function.

7. The method of claim 1, wherein the program has been mutated.

8. A computer comprising:
a processor; and
a computer-readable medium comprising code, executable by the processor, for implementing a method comprising:
  receiving a plurality of execution traces of a program, each execution trace comprising a plurality of variable values, and wherein each execution trace of the program includes a semantic label describing a processing function of the program;
  encoding, by a first recurrent neural network, the plurality of variable values to generate a plurality of program states for each execution trace;
  determining, by a bi-directional recurrent neural network, a reduced set of program states for each execution trace from the plurality of program states,
  wherein determining the reduced set of program states for each execution trace from the plurality of program states comprises:
    computing a forward sequence from the plurality of program states;
    computing a backward sequence from the plurality of program states;
    for each program state in the plurality of program states:
      determining a forward context vector from the forward sequence;
      determining a backward context vector from the backward sequence;
      applying a multi-layer perceptron to predict a necessity of each program state; and
      determining, based on a result of the multi-layer perceptron,
    whether to include the program state in the reduced set of program states;
  encoding, by a second recurrent neural network, the reduced set of program states to generate a plurality of executions for the program;
  pooling the plurality of executions to generate a program embedding;
  predicting semantics of the program using the program embedding in order to classify the program, wherein the predicted semantics include one or more semantic labels; and
  using the predicted semantics of the program to perform a compiler optimization task, wherein the method is optimized to minimize a cross-entropy loss and minimize a number of program states in the reduced set of program states.

9. The computer of claim 8, wherein the predicting semantics of the program comprises returning a probability of one of a list of program functionalities.

10. The computer of claim 8, wherein there are 50% fewer states in the reduced set of program states than in the plurality of program states.

11. The computer of claim 8, wherein each execution trace in the plurality of execution traces is generated with randomly generated inputs.

12. The computer of claim 8, wherein determining the forward context vector comprises pooling a subset of components of the forward sequence, the subset of components of the forward sequence comprising information from a first s-1 program states, and wherein determining the backward context vector comprises pooling a subset of components of the backward sequence, the subset of components of the backward sequence comprising information from a last m-s program states.

13. The computer of claim 8, wherein the predicting semantics is performed with an output of a softmax function.

14. The computer of claim 8, wherein the program has been mutated.

15. The method according to claim 1, wherein a deep learning model predicts the semantics of the program, and the method further comprises evaluating an accuracy of tasks performed by the deep learning model.

* * * * *